United States Patent [19] [11] Patent Number: 4,702,502
Shade et al. [45] Date of Patent: Oct. 27, 1987

[54] GASKET FOR MAKING JOINTS IN CORRUGATED PLASTIC PIPE

[75] Inventors: James W. Shade, Middletown; Robert J. Higgs, Springboro, both of Ohio

[73] Assignee: Contech Construction Products Inc., Middletown, Ohio

[21] Appl. No.: 762,909

[22] Filed: Aug. 6, 1985

[51] Int. Cl.<sup>4</sup> ............................................. F16L 21/02
[52] U.S. Cl. .................................... 285/231; 285/345; 285/369; 285/903; 277/207 A
[58] Field of Search ............... 285/231, 230, 345, 903, 285/369, 235; 277/186, 185, 184, 183, 182, 207 A, 208

[56] References Cited

U.S. PATENT DOCUMENTS

| 1,985,325 | 12/1934 | Nathan | 285/374 X |
|---|---|---|---|
| 2,271,777 | 2/1942 | Nathan | 277/207 A |
| 2,448,769 | 9/1948 | Chamberlain | 285/231 |
| 2,882,073 | 4/1959 | James | 277/207 A |
| 2,953,398 | 9/1960 | Haugen et al. | 285/231 X |
| 2,982,569 | 5/1961 | Miller et al. | 285/230 |
| 3,048,415 | 8/1962 | Shook | 277/208 X |
| 3,125,858 | 3/1964 | Baittinger | 285/369 X |
| 3,565,464 | 2/1971 | Wolf | 285/98 |
| 4,061,368 | 12/1977 | Auriemma | 285/383 |
| 4,124,236 | 11/1978 | Guidry | 285/373 |
| 4,141,576 | 2/1979 | Lupke et al. | 285/369 |
| 4,175,475 | 11/1979 | Eckhardt | 92/33 |
| 4,186,932 | 2/1980 | Emhardt et al. | 277/186 X |
| 4,189,172 | 2/1980 | Perrin | 285/367 X |
| 4,369,992 | 1/1983 | Fournier | 285/256 |
| 4,437,691 | 3/1984 | Laney | 285/353 |

FOREIGN PATENT DOCUMENTS

| 856283 | 11/1952 | Fed. Rep. of Germany | 277/207 A |
| 1150947 | 1/1958 | France | 285/231 |
| 557464 | 7/1958 | Italy | 285/369 |
| 1201304 | 8/1970 | United Kingdom | 285/231 |
| 2094916 | 9/1982 | United Kingdom . | |

OTHER PUBLICATIONS

Hegler Plastik GmbH, Mar. 10, 1981, pp. 1-7.

Primary Examiner—Thomas F. Callaghan
Attorney, Agent, or Firm—Wood, Herron & Evans

[57] ABSTRACT

A telescopic joint in low pressure corrugated plastic pipe. The joint includes a one-piece elastomeric gasket which functions as a seal between the telescoped pipes. The gasket has a sealing portion adapted to be disposed in a groove in one of the pipes and an anchoring portion adapted to be disposed in an adjacent groove. As the pipes are telescoped together the anchoring portion is trapped in the groove and anchors the sealing portion in place as it is compressed due to an interference fit with the pipes as the joint is made.

18 Claims, 10 Drawing Figures

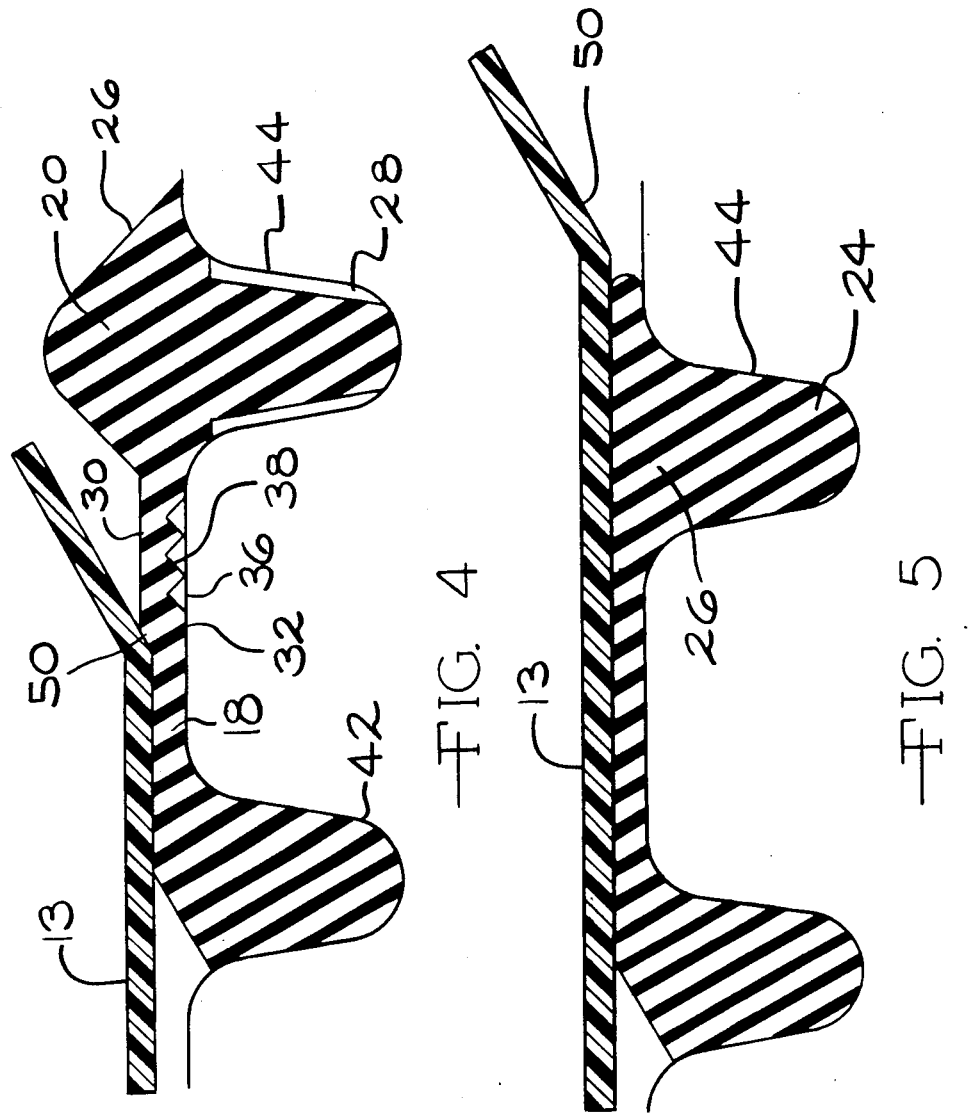

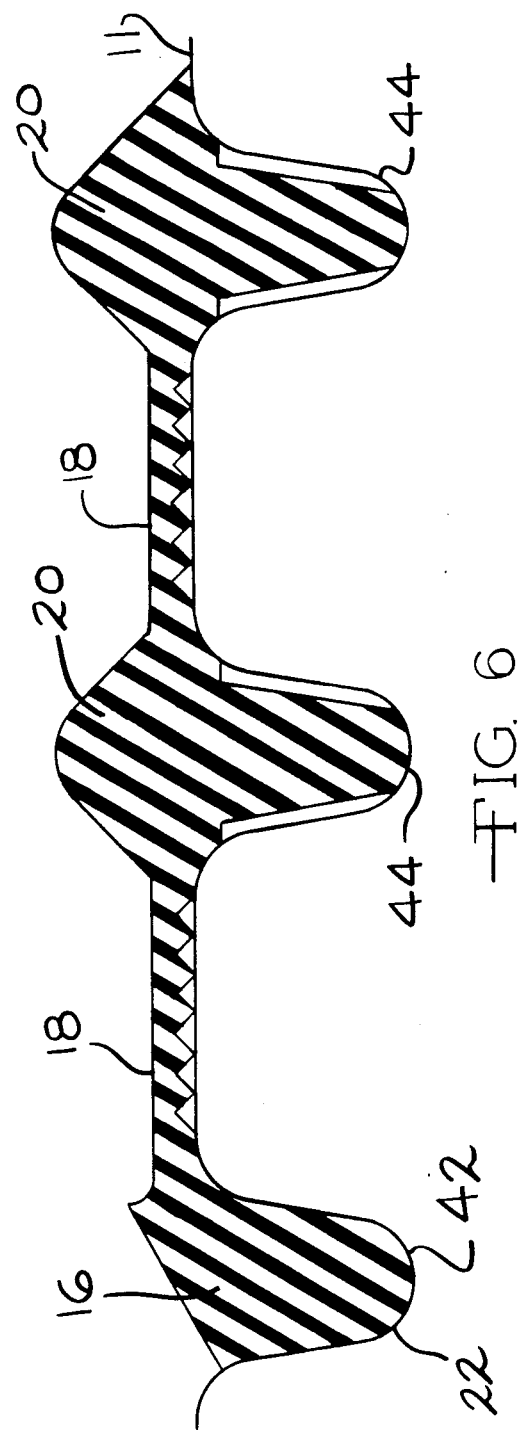
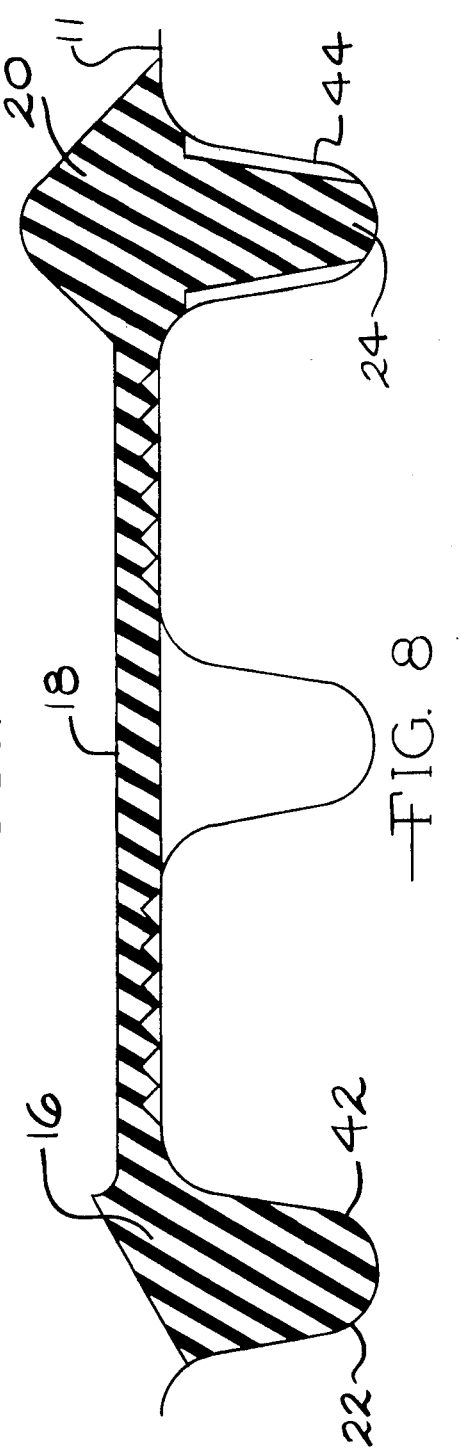

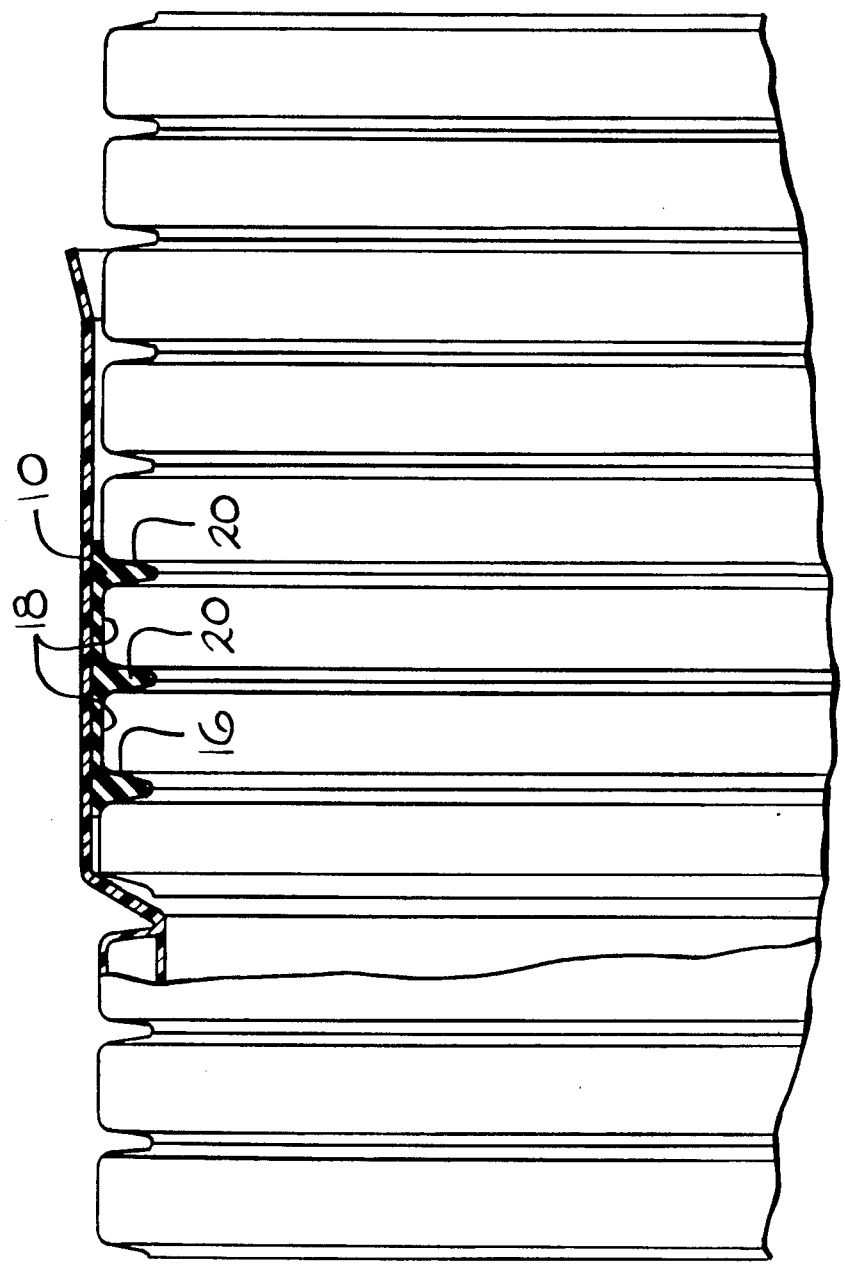

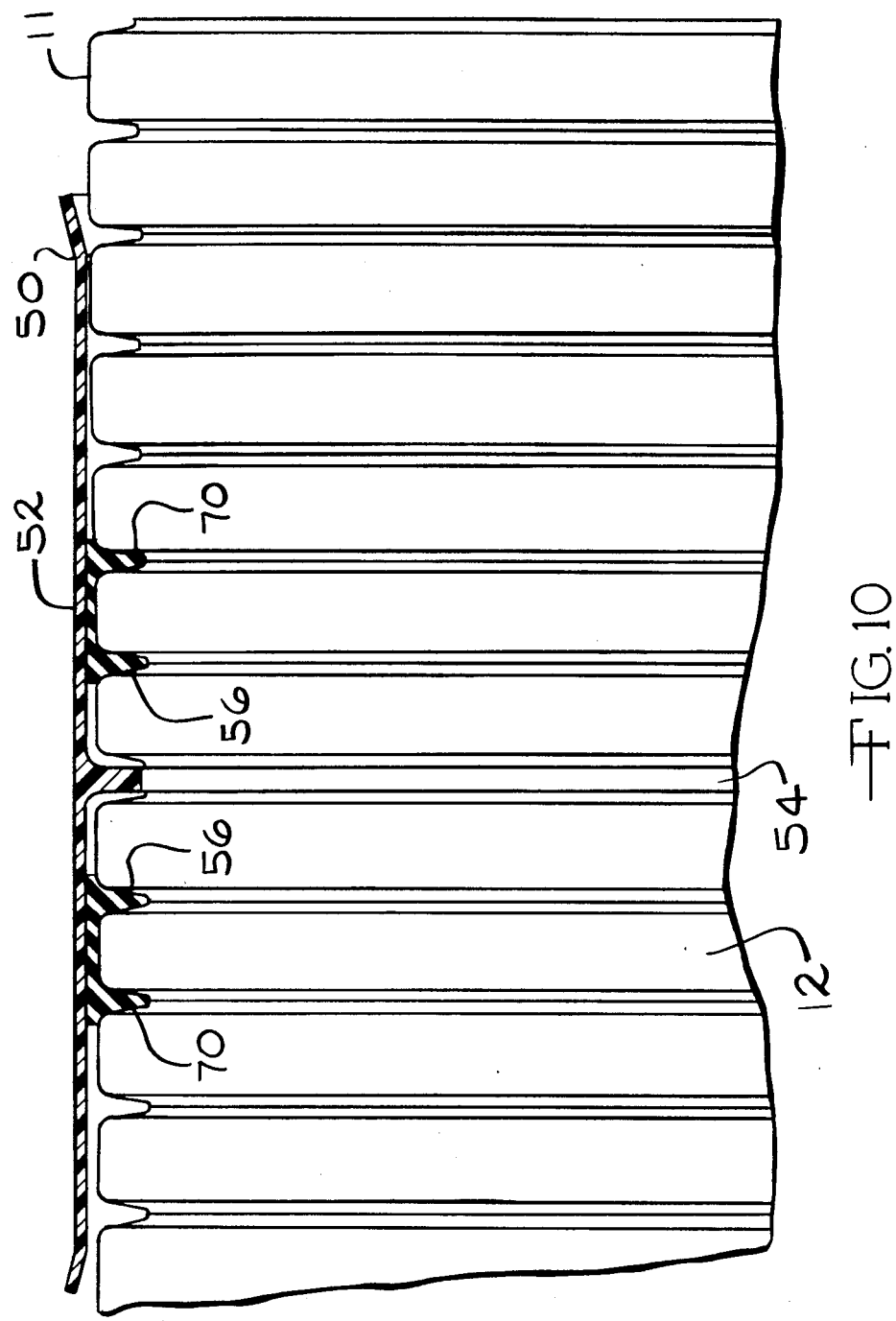

GASKET FOR MAKING JOINTS IN CORRUGATED PLASTIC PIPE

BACKGRDUND OF THE INVENTION

The present invention relates to elastomeric gaskets, and more specifically to gaskets for sealing a telescopic joint between a pair of tubular members, such as corrugated plastic pipe.

It is well known to form a telescopic joint between two corrugated plastic pipe sections with one end of one pipe section having an enlarged bell portion. An elastomeric gasket is placed around one end of one section which is then inserted into an enlarged bell end of a second pipe section.

Such gaskets generally are profiled to conform to the pipe corrugations. They usually include an upper surface which is compressed as one end of a pipe section is inserted into an enlarged end of a section pipe section. However, as one end of a pipe section enters the enlarged end of another pipe section, the gasket tends to roll from the corrugations. When this happens, the seal may be imperfect so that ground water may infiltrate into the sewer system or sewage or other fluid passing through the pipe may leak into the soil surrounding the pipe joint.

The improved gasket of our invention has eliminated the problem of the gasket rolling out of the corrugation by utilizing an anchor portion connected to a sealing portion. The anchor portion holds the sealing portion in place as the end of one pipe section is inserted into the enlarged end of a second pipe section.

BRIEF SUMMARY OF THE INVENTION

This invention relates to an improved elastomeric gasket for making a joint between a pair of tubular sections such as corrugated plastic pipe. The primary use is low pressure or gravity flow applications such as sewer lines. The gasket includes an anchor portion connected to a sealing portion. The anchor portion is adapted to be disposed in a pipe groove and extend out of the pipe groove to provide a slight interference fit as two pipe ends are telescoped together. The sealing portion is adapted to be disposed in another pipe groove and extend out of the pipe groove to provide a substantial interference fit as two pipe end sections are telescoped together. As two pipe ends are telescoped together, the anchoring portion of the gasket is engaged before the sealing portion. A pipe end easily slides over the anchor portion trapping it in a pipe groove. The pipe end then engages and compresses the sealing portion. The sealing portion is held in another pipe groove by the anchor portion.

It is a principal object of the present invention to provide an elastomeric gasket which will not rotate or otherwise become unseated from pipe corrugations as one end of a pipe section is inserted into the enlarged end of a second pipe section.

An advantage of our invention is elimination of maintenance costs and repair for leaky joints discovered after a pipe line has been installed.

The above and other objects, features and advantages of our invention will become apparent upon consideration of the detailed description and appended drawing.

BRIEF DESCRIPTION OF THE DRAWING

FIGS. 4 and 5 show enlarged cross-sections in stages of partial and complete assembly respectively of a telescopic joint;

FIG. 6 is a cross-section of another embodiment of the gasket;

FIG. 7 shows a partial cross-section of the gasket of FIG. 6 forming a seal in a telescopic joint;

FIG. 8 is a cross-section of a further embodiment of the gasket;

FIG. 10 shows a partial cross-section of the gasket of FIG. 1 forming a seal in a further embodiment of a telescopic joint.

DETAILED DESCRIPTION OF THE PREFERRED EMBODIMENT

Figure 3:
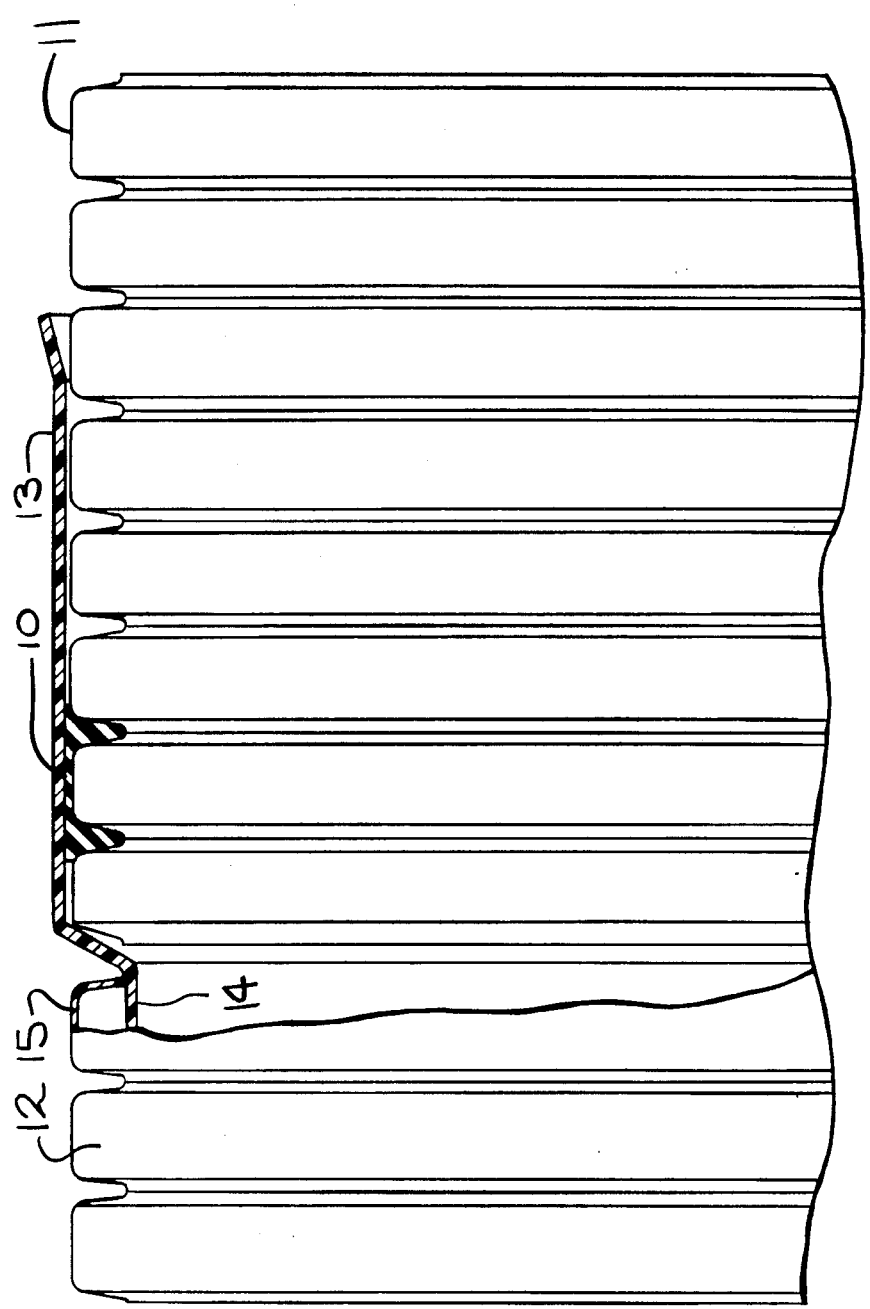
FIG. 3 shows a partial cross-section of the gasket of FIG. 1 forming a seal in a telescopic joint.

FIG. 3 show a joint formed between a first pipe end section 11 inserted into an enlarged end member 13 of a second pipe section 12. The pipe sections of FIG. 3 include double plastic walls having a smooth inside wall 14 fused to a corrugated outside wall 15 having an integral bell or enlarged end 13.

Figure 1:
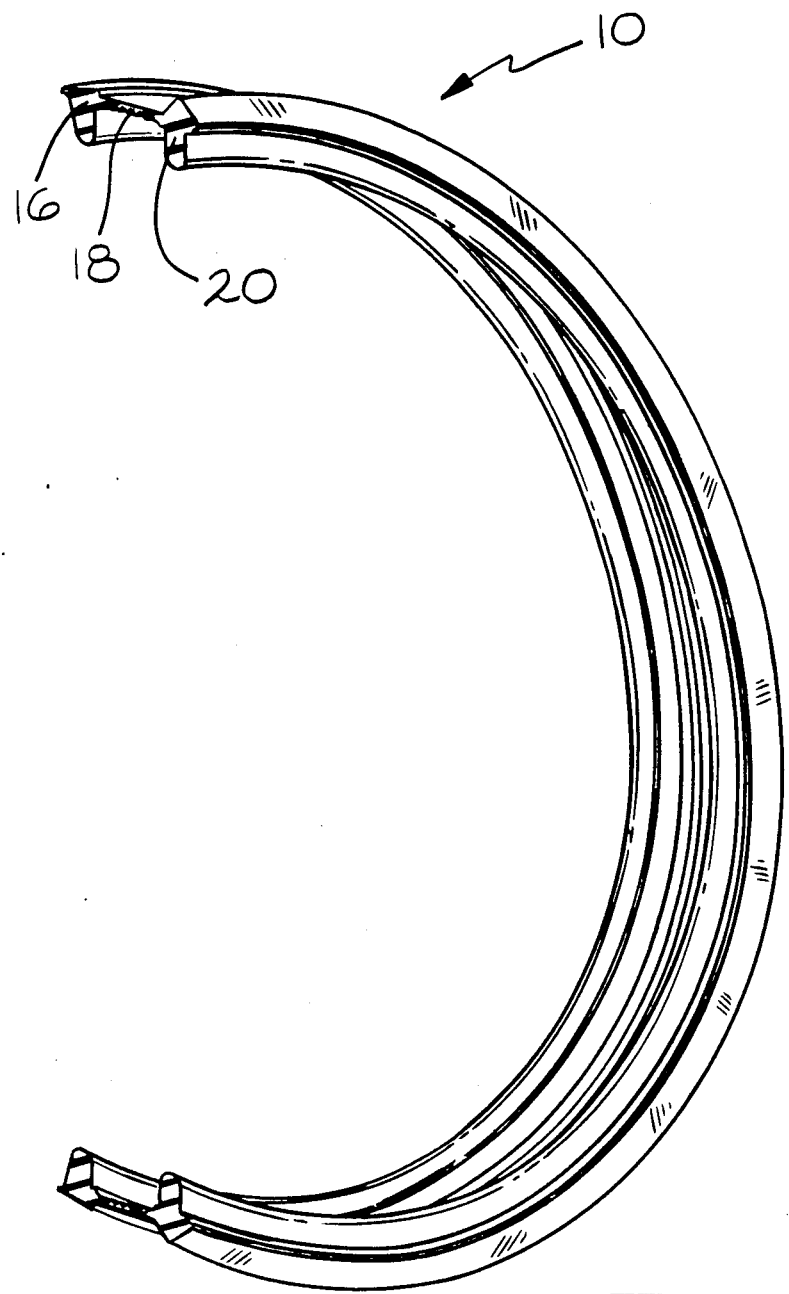
FIG. 1 is a perspective view of one embodiment of an elastomeric gasket of the invention.

Referring to FIG. 1, reference numeral 10 refers to an elastomeric gasket for forming the joint of FIG. 3 and includes an anchor portion 16, a connecting portion 18 and a sealing portion 20. Although gasket 10 could be used to form a joint between metal, concrete, or other tubular sections having at least two annular grooves on one end section, it has particular use with corrugated plastic pipe.

Anchor portion 16 includes an upper sloping surface 34 and a lower root portion 22 received within a first corrugation 42. Sealing portion 20 includes an upper raised surface 26 and a lower root portion 24 received within a second corrugation 44. Root portion 24 is preferably somewhat smaller than root portion 22 so as to provide a void 28 in corrugation 44 when the gasket is not compressed. Preferably, the void is provided by having root portion 24 extend the full depth of the corrugation. However, the width of root portion 24 is less than that of the width of the corrugation. As shown, the width of root portion 24 is somewhat less than root portion 22.

Connecting portion 18 includes a substantially planar upper surface 30 and a lower surface 32. Lower surface 32 lays on outside surface 36 of pipe 11. If the pipe is corrugated, surface 36 is the crest of a corrugation.

Raised surface 26 extends substantially above upper surface 30 of connecting portion 18. In a preferred embodiment, raised surface 26 includes a pair of gently sloping sides 46 converging toward each other to form an apex 48. In the embodiment shown, the slope is 45°.

Figure 2:
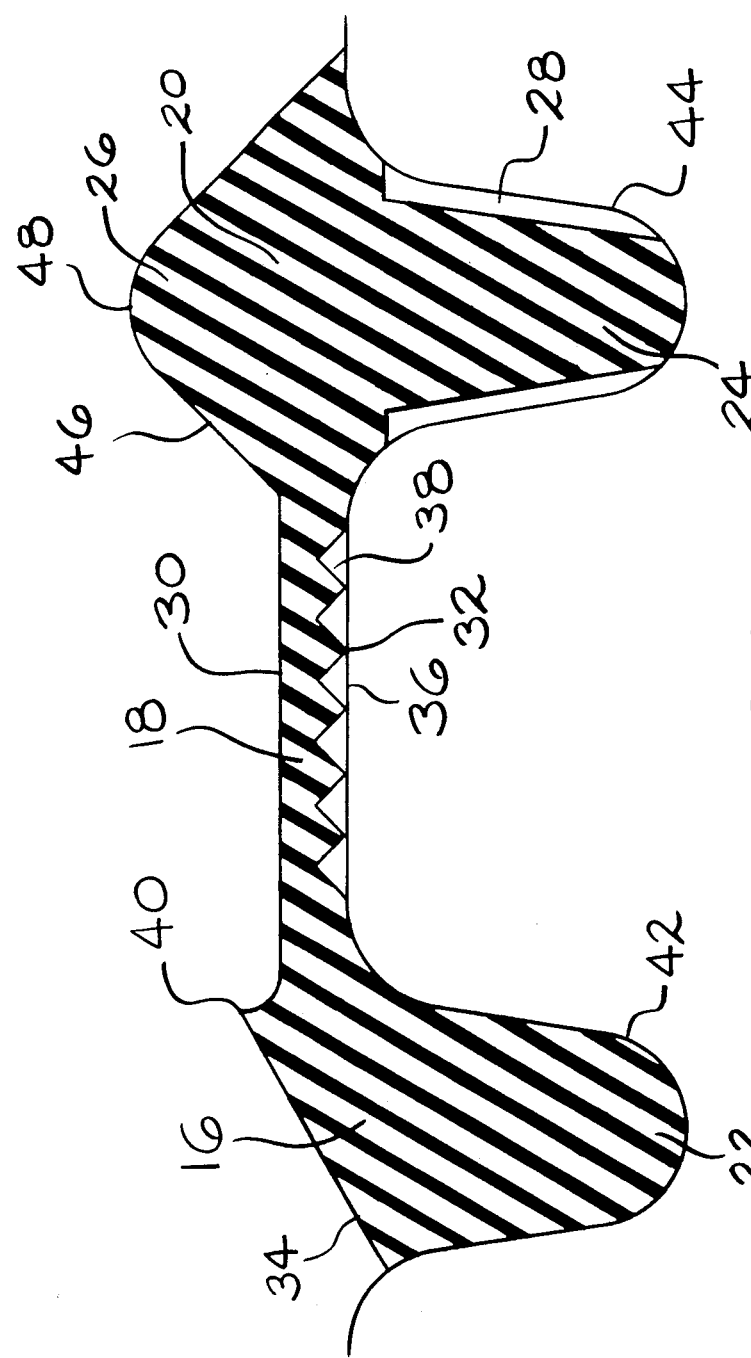
FIG. 2 is a cross section of the gasket of FIG. 1 fitted into corrugations of one end of a pipe section.

FIG. 4 and FIG. 5 show a joint being made using gasket 10 during installation of two tubular members. Gasket 10 preferably is disposed within the first two corrugations on the outside end of pipe section 11 as shown in FIG. 2. The end of this pipe section is then inserted into an enlarged or bell end of second pipe section 12. Although not necessary, it is preferred the inside diameter of enlarged member 13 of pipe section 12 be slightly less than the outside diameter of connecting portion 18. In any event, the inside diameter of enlarged member 13 must be less than the outside diameter of sealing portion 20.

As shown in FIG. 4, lower surface 32 of connecting portion 18 is serrated and has relief portions 38. When the diameter of enlarged member 13 is less than the outside diameter of connecting portion 18, leading edge 50 easily slides over upper surface 34 of anchor portion 16 and slightly compresses connecting portion 18 providing a slight interference fit. The slight compression of connecting portion 18 causes the elastomeric material to flow or be displaced toward pipe surface 36. As leading edge 50 moves toward sealing portion 20, relief portions 38 are closed. The anchor portion is trapped in corrugation 42.

Similarly, leading edge 50 slides over raised surface 26 displacing the elastomeric material causing it to flow and thereby filling voids 28 in second corrugation 44. See FIG. 5. Since the outside diameter of the sealing portion 20 is substantially greater than the inside diameter of enlarged member 13, there is a substantial interference fit between raised surface 26 and leading edge 50. Sealing portion 20 tries to rotate from corrugation 44 and along pipe surface 36. This rotation is prevented by anchor portion 16.

As noted above, upper surface 34 of anchor portion 16 must provide minimal resistance as leading edge 50 slides over gasket 10. As shown in FIG. 2, upper surface 34 preferably has a gentle slope of about 30° to minimize interference with leading edge 50. It is further preferred to have a slightly raised portion 40. In the event the inside diameter of enlarged portion 13 is slightly greater than the outside diameter of connecting portion 18, raised portion 40 may provide a slight interference fit. In any event, the primary seal is formed between enlarged portion 13 and sealing portion 20.

Figure 9:
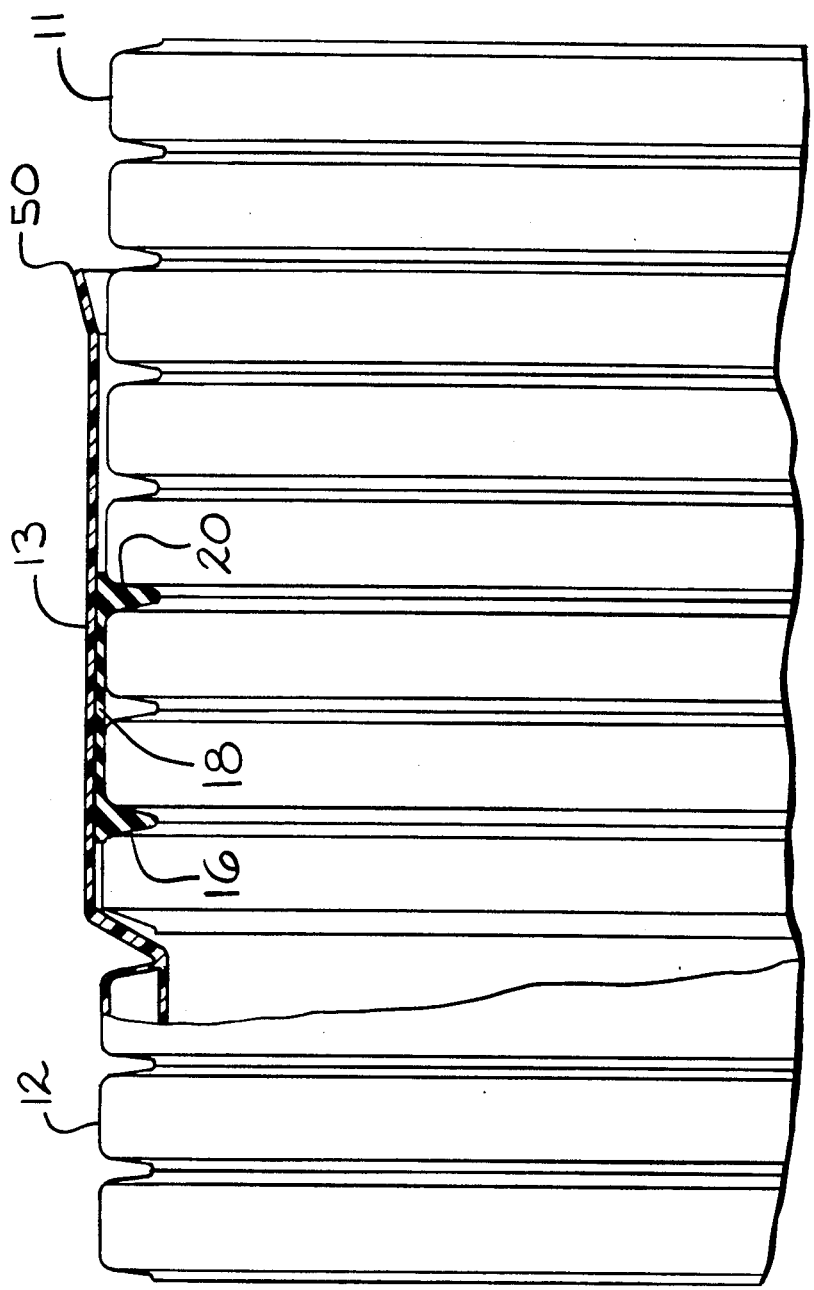
FIG. 9 shows a partial cross-section of the gasket of FIG. 8 forming a seal in a telescopic joint.

FIG. 6 and FIG. 8 show additional embodiments of gasket 10. FIG. 6 shows gasket 10 having a pair of sealing portions 20 interconnected by a pair of connecting portions 18. FIG. 8 shows gasket 10 identical to that in FIG. 1 except sealing portion 20 is positioned within the third corrugation from the end of pipe section 11. Any number of anchor or sealing portions could be possible. FIG. 7 and FIG. 9 show telescopic joints being formed between two pipe end sections using the gaskets of FIG. 6 and FIG. 8, respectively.

FIG. 10 shows another embodiment for making a joint. In the event it is not possible to form a bell or enlarge one end of each pipe section, conventional sleeve 52 may be used. Sleeve 52 is enlarged on both ends to receive ends of pipe sections 11 and 12. Sleeve 52 is provided with centering stop 54. It should be noted the relative positions of anchor portions 56 and sealing portions 70 are reversed on the two pipe sections. The anchor portions are always innermost relative to the sealing portions inside sleeve 52.

The telescopic joints shown in FIG. 3, FIG. 7, FIG. 9 and FIG. 10 are all formed by having corrugations on the outside of the pipe sections. The joint could also be formed by having annular grooves on the inside of enlarged member 13 or sleeve 52 instead of grooves or corrugations on the outside of the pipe sections. If the grooves are on the inside wall, gasket 10 would be disposed within the grooves inside enlarged member 13 or sleeve 52. Then, a telescopic joint is formed by inserting a pipe end section within enlarged member 13 or sleeve 52.

Typical dimensions for synthetic rubber gaskets used on double wall corrugated plastic pipe to make water tight joints according to our invention were as follows:

|  | 4 Inch (102 mm) | 6 Inch (152 mm) |
| --- | --- | --- |
| Corrugation Spacing | .42" (10.7 mm) | .52" (13.2 mm) |
| Corrugation Depth | .13" (3.3 mm) | .22" (5.6 mm) |
| Corrugation Width | .21" (5.3 mm) | .21" (5.3 mm) |
| Gasket Diameter Seal Portion | 4.20" (106.7 mm) | 6.26" (159.0 mm) |
| Pipe Bell Inside Diameter | 4.10" (104.1 mm) | 6.15" (156.2 mm) |

A variety of natural or synthetic rubbers such as isoprene or ethylene propylene diene momomer (EPDM) could be used as the gasket material. A material we have found especially satisfactory is EPDM.

It will be understood that various modifications can be made to our invention without departing from the spirit and scope of it. Therefore, the limits of our invention should be determined from the appended claims.

We claim:

1. For use with a first pipe having a plurality of annular grooves and a second pipe, an elastomeric gasket for forming a seal in a telescopic joint between the first and second pipes comprising:
   a sealing portion adapted to be disposed in one of the first pipe annular grooves and extend out of the one groove,
   an anchoring portion adapted to be disposed in another of the first pipe annular grooves and extend out of the other groove, and
   a portion connecting said sealing portion and said anchoring portion, said gasket for forming a seal as the pipes are telescoped to form a joint, said anchoring portion adapted to be trapped in the other groove of said first pipe thereby anchoring said sealing portion in the one groove of said first pipe for engagement and compression by the second pipe during telescoping of the pipes.

2. A gasket as set forth in claim 1 adapted for substantial interference fit between said sealing portion and the second pipe.

3. A gasket as set forth in claim 2 adapted for slight interference fit between said sealing portion and said second pipe.

4. A gasket as set forth in claim 3 wherein said anchoring and connection portions are adapted for said slight interference fit.

5. A gasket as set forth in claim 1 having a plurality of said sealing portions.

6. A gasket as set forth in claim 1 wherein said sealing portion has a configuration which is adapted to only partially fill the one groove prior to telescoping of the first and second pipes and substantially fill the one groove after telescoping of the first and second pipes.

7. A gasket as set forth in claim 1 wherein said sealing portion includes a sloping surface adapted to facilitate telescoping of the first and second pipes.

8. A gasket as set forth in claim 3 wherein said anchoring portion includes a first sloping surface and said sealing portion includes a second sloping surface adapted to facilitate telescoping of the first and second pipes.

9. A gasket as set forth in claim 4 wherein said connection portion includes a serrated surface adapted to accommodate displacement of said connecting portion when the first and second pipes are telescoped.

10. For use with a first corrugated pipe having a plurality of annular grooves and a second pipe, an elastomeric gasket for forming a seal in a telescopic joint betw the first and second pipes comprising:
a sealing portion adapted to be disposed in one of the first pipe annular grooves and extend out of the one groove,
an anchoring portion adapted to be disposed in another of the first pipe annular grooves and extend out of the other groove, and
a portion connecting said sealing portion and said anchoring portion,
said sealing and anchoring portions adaped for extension out of the grooves so there is a slight interference fit between said anchoring portion and the second pipe and a substantial interference fit between said sealing portion and the second pipe as the first pipe is inserted into the second pipe to form a joint, said anchoring portion adapted to be trapped in the other groove of said first pipe thereby anchoring said sealing portion in the one groove of said first pipe for engagement and compression by the second pipe during insertion of the first pipe into the second pipe.

11. A pipe joint assembly comprising:
a first pipe having a plurality of annular grooves,
a second pipe,
said pipes being telescoped relative to each other, and a gasket adapted for location between said pipes in sealing relationship,
said gasket including a sealing portion for disposition in one of said first pipe grooves and extending out of said one groove, an anchoring portion for disposition in another of said grooves and extending out of said first pipe other groove, and a portion connecting said sealing and anchoring portions, said gasket adapted for a substantial interference fit between said sealing portion and said second pipe so that as said pipes are telescoped to form a pipe joint said anchoring portion is adapted to be trapped in said other first pipe groove, thereby anchoring said sealing portion in said one groove of said first pipe for engagement and compression by said second pipe during telescoping of said pipes.

12. A joint assembly as set forth in claim 11 having said gasket adapted for slight interference fit between said anchoring portion and said second pipe.

13. A joint assembly as set forth in claim 12 wherein said said anchoring and connecting portions are adapted to provide said slight interference fit.

14. A joint as set forth in claim 11 wherein said first and second pipes are corrugated.

15. A joint as set forth in claim 11 wherein said grooves are on the outside of said first pipe, and said second pipe includes an enlarged bell end.

16. A joint as set forth in claim 11 wherein said gasket includes a plurality of said sealing portions.

17. A joint as set forth in claim 11 having said anchoring and sealing portions adapted disposition in adjacent said grooves.

18. A pipe joint assembly comprising:
a sleeve,
a first pipe with a plurality of annular grooves,
said first pipe for partially telescoping into said sleeve,
a second pipe with a plurality of annular grooves,
said second pipe for partially telescoping into said sleeve,
a first gasket for disposition between said sleeve and said first pipe, said first gasket including a sealing portion for one of said grooves of said first pipe and extending out of said groove to engage said sleeve with a substantial interference fit, an anchoring portion for another of said grooves of said first pipe and extending out of said other groove, and a portion connecting said sealing and anchoring portions,
a second gasket for disposition between said sleeve and said second pipe, said second gasket including a sealing portion for one of said grooves of said second pipe and extending out of said groove to engage said sleeve with a substantial interference fit, an anchoring portion for another of said grooves of said second pipe and extending out of said other groove, and a portion connecting said sealing and anchoring portions,
said gaskets for disposition so that as said pipes are telescoped into said sleeve, said anchoring portions adapted to be first trapped in said other grooves by said sleeve and then said sealing portions adapted to be compressed by said sleeve whereby rollover of said gaskets is prevented.

* * * * *